(12) United States Patent
Topham et al.

(10) Patent No.: US 8,337,301 B2
(45) Date of Patent: Dec. 25, 2012

(54) CASINO GAME DOWNLOAD SYSTEM AND METHOD OF USE

(75) Inventors: Jeffrey S. Topham, Las Vegas, NV (US); David Lawdensky, Pahrump, NV (US); David Salour, Las Vegas, NV (US); Jeff C. Himmelright, Round Rock, TX (US); Gary Frerking, Henderson, NV (US)

(73) Assignee: Aristocrat Technologies Australia Pty. Ltd (AU)

( * ) Notice: Subject to any disclaimer, the term of this patent is extended or adjusted under 35 U.S.C. 154(b) by 1106 days.

(21) Appl. No.: 11/938,105

(22) Filed: Nov. 9, 2007

(65) Prior Publication Data

US 2008/0188311 A1 Aug. 7, 2008

Related U.S. Application Data

(60) Provisional application No. 60/865,299, filed on Nov. 10, 2006.

(51) Int. Cl.
A63F 9/24 (2006.01)
(52) U.S. Cl. .......................................... 463/29; 463/32
(58) Field of Classification Search .................... 463/29, 463/32
See application file for complete search history.

(56) References Cited

U.S. PATENT DOCUMENTS

| 6,362,836 | B1 * | 3/2002 | Shaw et al. ................. 715/744 |
| 2004/0116186 | A1 | 6/2004 | Shim et al. |
| 2008/0200259 | A1 * | 8/2008 | Deng ............................. 463/42 |
| 2008/0254883 | A1 * | 10/2008 | Patel et al. .................... 463/31 |
| 2010/0035693 | A1 * | 2/2010 | Himmelright et al. ......... 463/42 |
| 2010/0113162 | A1 * | 5/2010 | Vemuri et al. .................. 463/42 |
| 2011/0269549 | A1 * | 11/2011 | Kelly et al. ..................... 463/42 |
| 2012/0077570 | A1 * | 3/2012 | Kelly et al. ..................... 463/25 |
| 2012/0088572 | A1 * | 4/2012 | Kelly et al. ..................... 463/25 |

FOREIGN PATENT DOCUMENTS

| KR | 20010082553 | 8/2001 |
| KR | 20030048275 | 6/2003 |

OTHER PUBLICATIONS

International Preliminary Report on Patentability for International Patent Application Serial No. PCT/US2007/084310, mailed May 22, 2009.
Communication with Supplementary European Search Report corresponding to European Patent Application No. EP07864232.9-2221/2080164 PCT/US2007084310, 4 pages, Dec. 17, 2010.
Notice from the European Patent Office dated Oct. 1, 2007 concerning business methods, 2 pages.

* cited by examiner

Primary Examiner — Pierre E Elisca
(74) Attorney, Agent, or Firm — McAndrews, Held & Malloy, Ltd.

(57) ABSTRACT

Certain embodiments provide systems and methods for multi-tiered gaming data download. The system includes a gaming device for local play of a game. The gaming device includes a communication interface receiving and transmitting data to download a game for play at the gaming device. The system also includes a plurality of download servers communicating with the gaming device to provide game data for download to and play at the gaming device. The system further includes a middle tier server acting as a hub to communicate with the plurality of download servers to provide game data from one or more of the plurality of download servers. The middle tier server allocates download server resources and schedules a download of game data from one or more download servers to the gaming device based on resource constraints at the plurality of download servers and availability for download at the gaming device.

27 Claims, 9 Drawing Sheets

FIG. 1

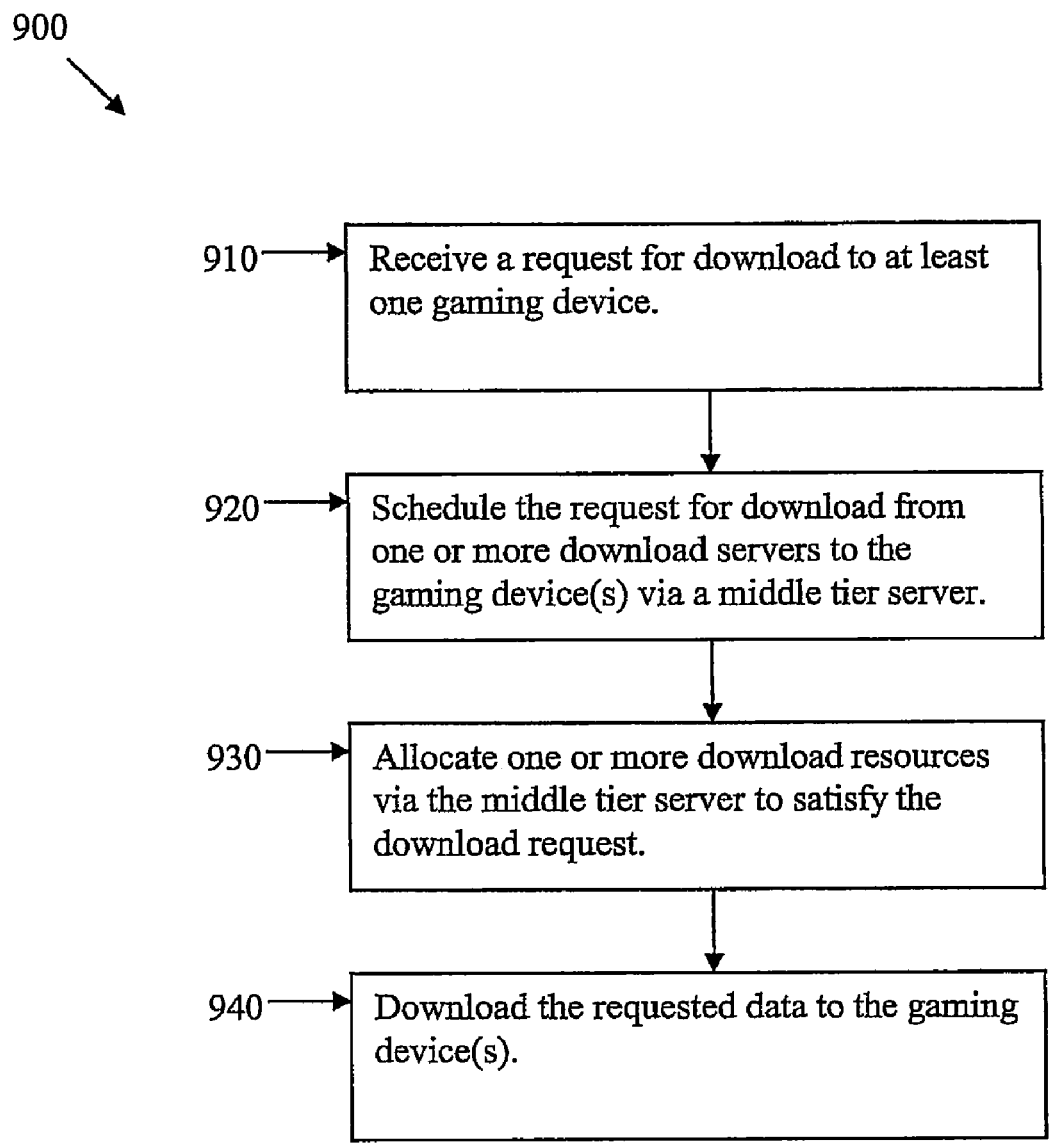

CASINO GAME DOWNLOAD SYSTEM AND METHOD OF USE

RELATED APPLICATIONS

The present application relates to, and claims priority from, U.S. Provisional Application No. 60/865,299, filed on Nov. 10, 2006, with inventors Jeff Topham, David Lawdensky, David Salour, Jeff Himmelright, and Gary Frerking, and entitled Casino Game Download System and Method of Use" which is herein incorporated by reference in its entirety.

BACKGROUND OF THE INVENTION

The present invention generally relates to a gaming system network. In particular, the present invention relates to a configuration and control system that allows one or more gaming systems to dynamically request applications and/or services from one or more servers.

Gaming machines, such as slot machines, fruit machines, or poker machines, have in recent years become one of the more popular, exciting, and sophisticated wagering activities available at casinos and other gambling locations. At the same time, gaming machines have also become a source of greater revenue for gaming establishments. Thus, competition between manufacturers of gaming machines has intensified as competitors vie for business from gaming establishments.

A gaming machine providing entertaining and enticing features for players would be highly desirable to attract both new and returning players to a gaming establishment. Additionally, a gaming machine that allows customization and dynamic modification by an operator would be highly desirable to provide new features to customers.

Current gaming machines are difficult to reconfigure and offer the same game to multiple users at multiple gaming establishments. Certain games may become old or unattractive to players and need updating or replacing. Changing a gaming machine to a different game or format involves time-consuming and difficult procedures by an operator. Thus, an improved system and method for updating or replacing games or other applications on a gaming machine or other gaming system would be highly desirable.

Additionally, configuration of a gaming machine by an operator raises concerns regarding security of data and integrity of a game on the gaming machine. That is, gaming establishments and legal authorities place high priority on the integrity of a game, such as a slot or poker game. Thus, there is a need for a configurable system that does not disturb sensitive game or prize data.

Current systems are often susceptible to reduced performance during peak periods of activity caused by overburdened servers providing applications to gaming machines or gaming workstations. Additionally, failures in current gaming environments often lead to play stoppage or other gaming problems. Casinos and other gaming establishments seek to avoid such delays and system failures to maintain player enjoyment and encourage repeated play and repeated visits. Thus, a system and method that improves gaming reliability and efficiency would be highly desirable.

Thus, there is a need for a configuration and control system and method for a gaming environment that allows one or more gaming systems to dynamically request applications and/or services from one or more servers.

BRIEF SUMMARY OF THE INVENTION

The present invention provides systems and methods for multi-tiered game download to one or more gaming devices in a server-based or downloadable gaming environment.

Certain embodiments provide a system for game download. The system includes a gaming terminal for local play of a game. The gaming terminal includes a communication interface receiving and transmitting data to download a game for play at the gaming terminal. The system also includes one or more download servers communicating with the gaming terminal to provide game data for download to the gaming terminal for local play at the gaming terminal. The system further includes a middle tier server acting as a hub to communicate with the one or more download servers to provide game data to the gaming terminal from the one or more download servers and provide data from at least one of a database server and a user interface server. The middle tier server schedules a download of game data from at least one of the one or more download servers to the gaming terminal.

Certain embodiments provide a method for multi-tiered game download. The method includes receiving a request for a game download to at least one gaming device. The method also includes scheduling the request for game download from at least one of a plurality of download servers via a middle tier server. The method further includes allocating, via the middle tier server, one or more download resources from the plurality of download servers to satisfy the request for game download. Additionally, the method includes downloading the requested game to the at least one gaming device.

Certain embodiments provide a system for multi-tiered gaming data download. The system includes a gaming device for local play of a game. The gaming device includes a communication interface receiving and transmitting data to download a game for play at the gaming device. The system also includes one or a plurality of download servers communicating with the gaming device to provide game data for download to the gaming device for local play at the gaming device. The system further includes a middle tier server acting as a hub to communicate with the download server(s) to provide game data from one or more of the download server(s). The middle tier server allocates download server resources and schedules a download of game data from at least one of the plurality download servers to the gaming device based on resource constraints at the download server(s) and availability for download at the gaming device.

In certain embodiments, downloading of data from the one or more download servers to the gaming device is scheduled as a function of at least one of available bandwidth, gaming terminal download acceptance criteria and time of download.

In certain embodiments, an access point is provided for review, such as auditing and/or regulatory review, of gaming device and/or server operation, data, and download.

In certain embodiments, download of data to a gaming device is facilitated by a peer-to-peer transfer of the data from a second gaming device. The transfer may be coordinated by the middle tier server, for example.

In certain embodiments, a gaming device is reconfigured based on game data stored in memory at the gaming device in response to a signal from the middle tier server and/or one or more download servers.

BRIEF DESCRIPTION OF THE DRAWINGS

FIG. 9 illustrates a flow diagram for a method for multi-tiered game download in accordance with an embodiment of the present invention.

Figure 1:
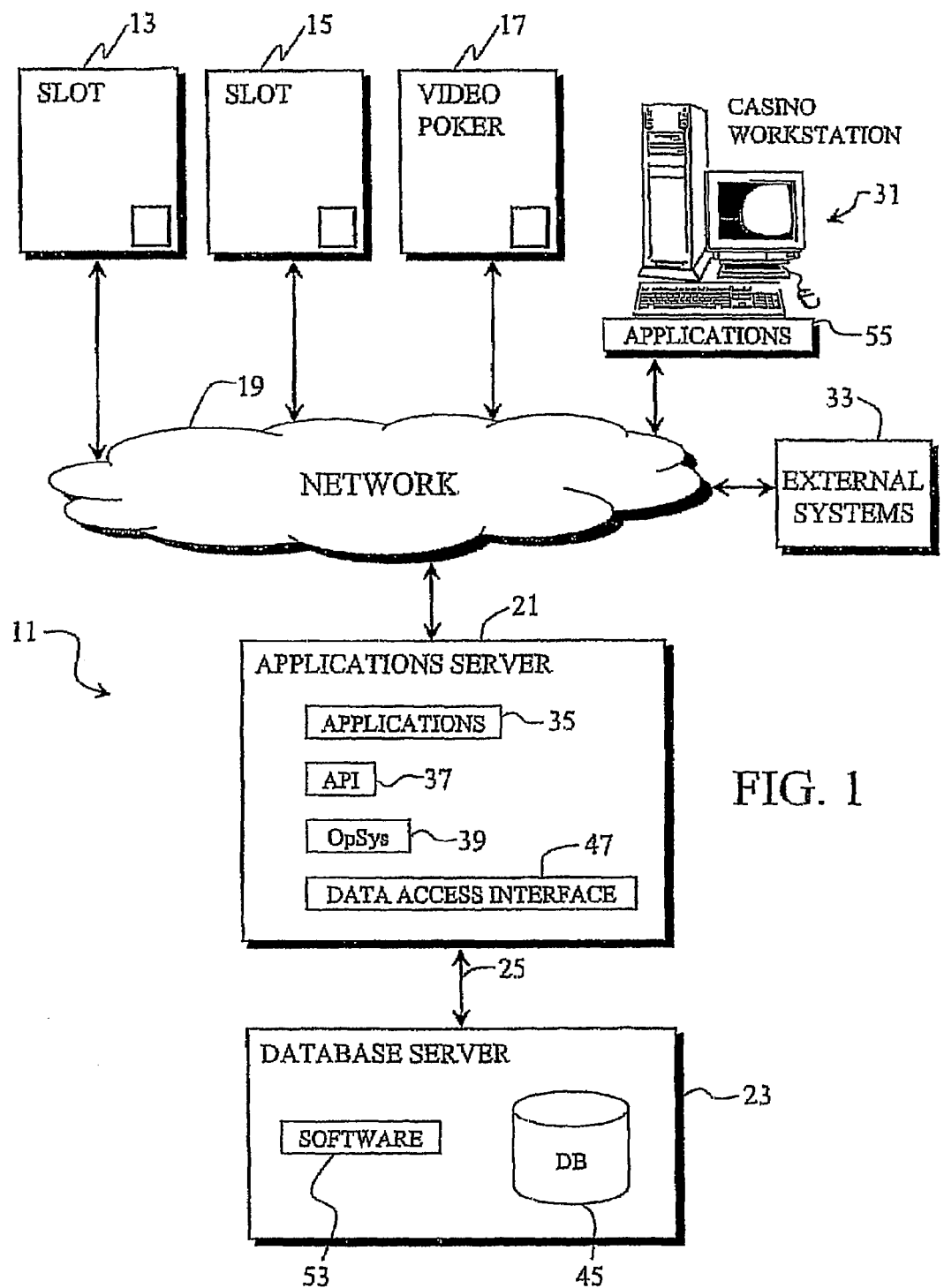
FIG. 1 is a block diagram of an embodiment of a casino management system in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Referring to FIG. 1, a casino network system 11 includes a plurality of gaming machines 13, 15, and 17 interconnected across a network 19 to an applications server 21. Applications server 21 is connected to a database server 23 via a communication link 25 which is separate from network 19.

System 11 also includes a casino workstation 31 connected to network 19. In addition, one or more external systems 33, for example workstations from remote casinos, may be connected to network 19.

Gaming machines 13, 15, 17, workstation 31 and external systems 33 utilize the applications or web services of application server 21. In addition, gaming machines 13, 15, 17, workstation 31 and external systems 33 may communicate with one another via network 19 using standard protocols. Communication between a gaming machine and network 19 may occur with or without a smart communications interface, for example. However, database server 23 can only be accessed via communication link 25.

Communication link 25 is a high speed data link, and provides considerably faster communication than that across network 19. Link 25 may be formed from fiber optic cabling using lower layer protocols such as 100BASE-T, Gigabit Ethernet, and FDDI (fiber distributed data interface).

Figure 2:
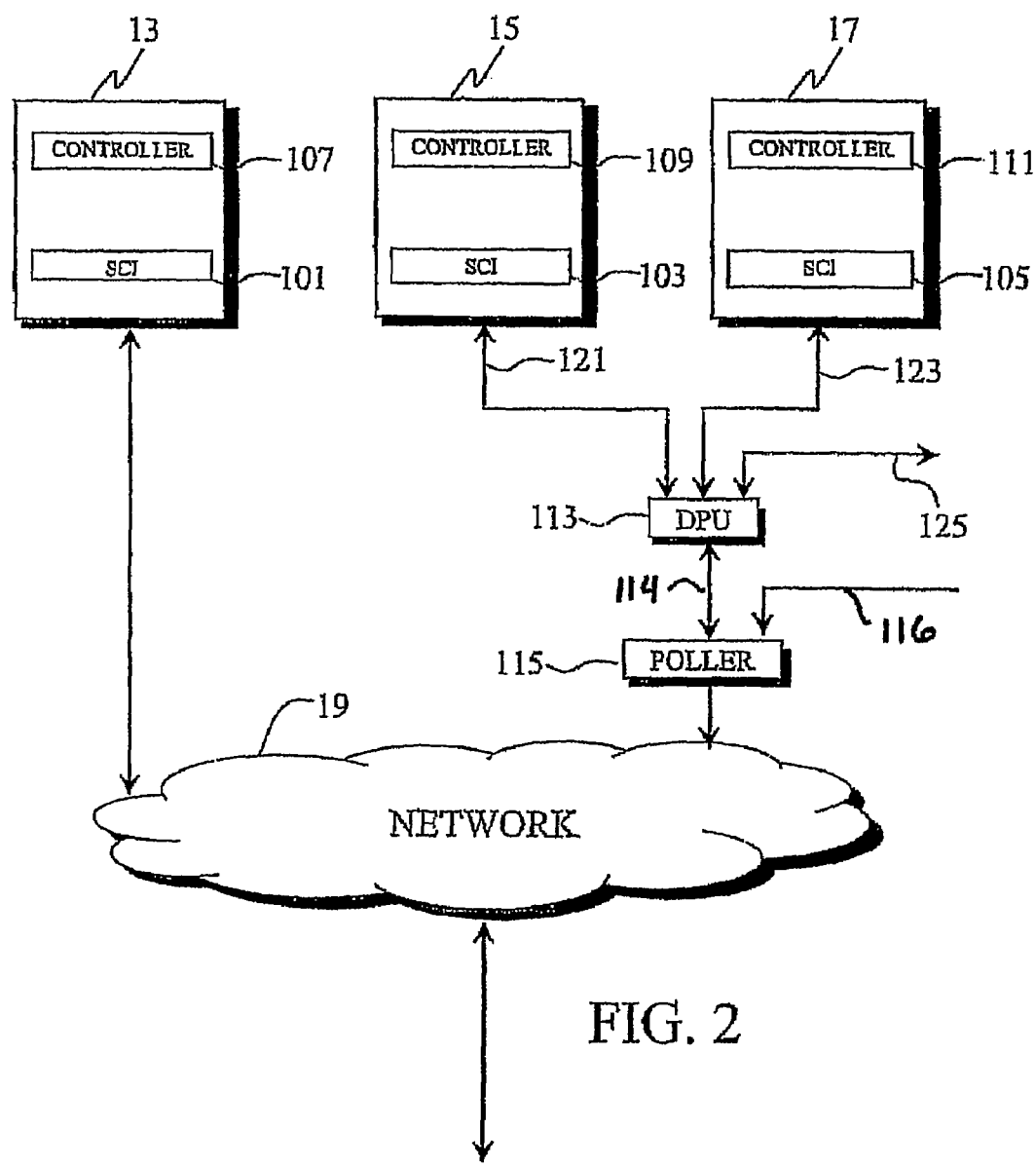
FIG. 2 is a block diagram of an embodiment of a portion of the casino management system of FIG. 1 in accordance with an embodiment of the present invention.

Referring to FIG. 2, each gaming machine 13, 15, 17 includes a smart communications interface (SCI) 101, 103, 105, respectively, which communicates with a respective game controller 107, 109, 111 using a particular protocol, for example, a Slot Accounting System (SAS) protocol, a Slot Data System (SDS) protocol, GSA G2S protocol, or other protocol. SCI 101 communicates directly onto network 19, whereas SCI's 103, 105 communicate through a data port unit (DPU) 113 and a poller 115, in the particular embodiment of FIG. 2. In another embodiment, a game controller may incorporate SCI functionality and communicate directly with network 19.

DPU 113 continually polls SCI's 103, 105 along lines 121, 123, respectively. DPU 113 may communicate with other gaming machines (not shown) via one or more lines 125. Each SCI 103, 105 collects data from its associated game controller and then buffers the data for transmission to DPU 113. Communication between SCIs 103, 105 and DPU 113 may use an RS485 serial communication standard, for example.

Poller 115 communicates with DPU 113 along line 114. Poller 115 may communicate with other DPUs (not shown) via one or more lines 116. Poller 115 communicates with an addressed DPU 113, sending information to DPU 113 as well as retrieving information buffered by DPU 113. Polling by poller 115 occurs in a serial protocol fashion. Poller 115 communicates with one DPU 113 at a time. Each DPU 113 listens for a polling message from poller 115. When poller 115 has obtained data from a DPU 113, poller 115 packages the data and places it onto network 19.

In an embodiment, SCI 101 is not polled. Instead SCI 101 places information directly onto network 19. SCI 101 retrieves data from game controller 107 and transmits said data across network 19 to a destination specified by SCI 101. For example, when the protocol message of controller 107 indicates a meter change, SCI 101 reads the meter data and determines the meter change. SCI 101 then packages the data for placement onto network 19.

When SCI 103 retrieves data from game controller 109, for example, bill data indicating that a $50.00 bill has been inserted into the gaming machine's bill accepter, the bill data is stored in the buffer memory of SCI 103. After transmission of the bill data to SCI 103, the data is erased from or allowed to be overwritten in the buffer memory of controller 109.

DPU 113 then polls SCI 103 and the bill data is sent to DPU 113. However, SCI 103 does not immediately delete the bill data from its buffer memory in response to sending the data. DPU 113 stores the received bill data in its buffer memory. Thereafter, DPU 113 sends a confirmation signal to SCI 103 indicating that DPU 113 has successfully retrieved and stored the bill data. In response to receiving the confirmation signal, SCI 103 erases the bill data from its buffer memory (or allows the memory space to be overwritten with new data). This procedure guarantees delivery of data.

Poller 115 then polls DPU 113 and the bill data is next sent to poller 115. However, the DPU 113 does not immediately delete the data from its buffer memory in response to sending the data to poller 115. Poller 115 stores the received bill data in buffer memory. Thereafter, Poller 115 sends a confirmation signal to DPU 113 indicating that poller 115 has successfully retrieved and stored the data. In response to receiving the confirmation signal, DPU 113 erases the data from its buffer memory (or allows the memory space to be overwritten with new data). Poller 115 packages the data and places it onto network 19. Alternatively, the confirmation signal which is sent to DPU 113 may be sent after the data is written to a local disk (not shown) or to database 45.

Referring again to FIG. 1, applications server 21 is designed to be run on a network platform and to service requests from gaming machines 13, 15, 17, as well as from workstation 31 or external systems 33. Casino network system 11 provides a network environment in which, for example, Microsoft Corporation's .NET™ framework is used. Applications server 21 hosts various applications or web services that may be accessed from network 19, through standard protocols, such as XML (extensible markup language), SOAP (simple object access protocol), WAP (wireless application protocol), HTTP (hypertext transport protocol), SMTP (simple mail transfer protocol), etc.

Applications server 21 has a multi-tiered architecture that includes a number of software layers including one or more applications 35, an application program interface (API) 37, an operating system (OpSys) 39, and a data access interface layer 47. Applications 35 provide a number of different services, including accounting services, player tracking services, progressive game services, browsing services, cashless play services, etc. Applications 35 may be written in various languages including, for example, C#. Operating system 39, for example, is a Windows® brand operating system which provides conventional functions.

Applications server 21 can push out, i.e., publish, information to various subscribers including but not limited to gaming machines 13, 15, 17, workstation 31 or external systems 33. Likewise, poller 115 (FIG. 2) could be a subscriber for receiving information from applications server 21.

For example, applications server 21 may learn that a jackpot event has occurred. Server 21 then publishes that information to workstation 31, or for example, to a jackpot server (not shown). Workstation 31 subscribes to this jackpot notification service by a communication request sent over network 19 to applications server 21. The request asks server 21 to notify the specific workstation 31 whenever a jackpot event occurs. Workstation 31 makes use of this notification, for example, by (1) notifying casino personnel that a jackpot has occurred, (2) determining whether a jackpot fill of the particular gaming machine 13 is required, etc.

As another example, gaming machine 13 may subscribe to a "bonus time" alert. Applications server 21 notifies gaming machines that have subscribed that a bonus period has started and that jackpots are to be paid out at twice the pay table, for example. This bonusing service for particular gaming machines can be subscribed to, for example, using casino workstation 31. Workstation 31 may communicate a request to applications server 21 to publish to specifically-identified gaming machines that a bonus period is to begin. The request may also provide additional information as to the amount of the bonus, the type of bonus, a bonus multiplier, etc. The request may also ask server 21 to publish the end of the bonus period as well. The applications server 21 may provide such a bonus service in real time with the bonus event, or merely provide a scheduled command for future bonus events.

In another example, applications server 21 may publish to certain gaming machines that a tournament has ended. Using the method taught in U.S. Pat. No. 6,039,648, assigned to Casino Data Systems, server 21 may communicate the end of a tournament play, so that appropriate pay tables and displays at the gaming machines may be activated.

API 37 includes a plurality of functions that can be called by other systems or devices connected to network 19. Such functions include conventional method or function calls as well as remote calls, e.g., proxy and SOAP/XML invocations. For example, API 37 may be called by slot machines 13, 15, 17. Also workstation 31 includes software applications 55 which when executed make calls to API 37. Likewise, applications on external systems 33 are able to use the functions of API 37 by presenting calls over network 19.

For example, API 37 processes a publication request. Meter data is received by applications server 21 which indicates that a jackpot has occurred. API 37 stores the meter data and then publishes the data to all subscribers.

In another example, external system 33 may be a news reporting server located at an internet e-mail address. The news reporting server may request notification of all jackpot events that exceed $1,000,000.00.

Referring again to FIG. 1, database server 23 is a relational database server, for example, a Microsoft® Structured Query Language (SQL) server, or an Oracle® database server, or the like. Database server 23 includes a database (DB) 45 and software 53 which is executed to handle requests for particular services. The request is made by applications server 21 and typically the service requested is to provide data to or retrieve data from database 45. Examples of services provided by database server 23 include (1) database storage of gaming activity, player account information, advertisements, ticketing, etc. and (2) database retrieval of player information, accounting data, application programs, etc.

Data access interface 47 is a database access technology, for example, Microsoft's® ADO.NET software. Data access interface layer 47 interfaces with database server 23 to perform various tasks, for example, retrieving data from database server 23 in cached form.

Interface 47 provides SQL queries to execute stored procedures in software 53. For example, a fill procedure is called to fill a data set with data from database 45. The data set serves as a container that stores the data from database 45 in a cached form. The data set is transferred to applications server 21, and the server 21 is then disconnected from database server 23.

Figure 3:
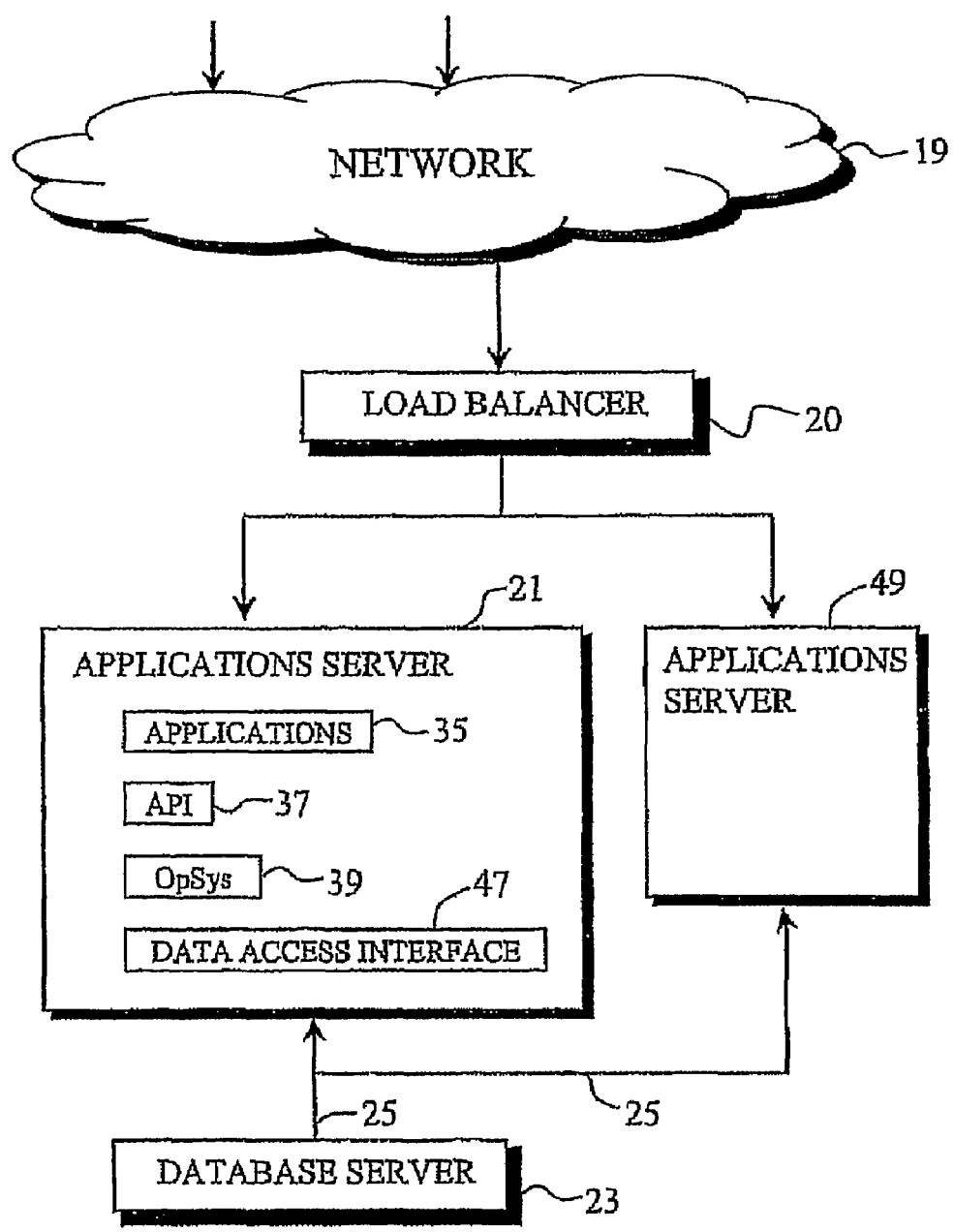
FIG. 3 is a block diagram of an embodiment of a portion of the casino management system of FIG. 1 in accordance with an embodiment of the present invention.

Referring to FIG. 3, other application servers, for example applications server 49, may be added to network 19 to service additional gaming machines as more and more gaming machines are added to system 11. Applications server 49 may likewise service casino workstation 31 (FIG. 1), external systems 33 (FIG. 1) and gaming machines 13, 15, 17 (FIG. 1), for example.

Applications server 49 is connected to database server 23 via communication link 25. Connections to database server 23 are made and broken, as requested data is cached for use by the particular applications servers 21, 49 requesting the data.

As shown in FIG. 3, a load balancer 20 may be connected between applications servers 21, 49 and network 19. Load balancer 20 shares the workload between applications server 21 and applications server 49. When a service request is received by load balancer 20, balancer 20 distributes the request to either applications server 21 or 49 as appropriate. If applications server 21 is turned OFF, or drops out of the system, load balancer 20 makes use of application server 49 instead. The other network components are blind to the number of applications servers which are providing services. Each applications server 21, 49 may contain identical applications 35 to enable load balancing. More than one load balancer 20 may provide additional system redundancy and scaling.

Alternatively, poller 115 (FIG. 1), for example, may identify the specific applications server (21 or 49) which is to service the poller's request.

API 37 of applications server 21 may respond to a request only if the request bears a valid license token. Thus, an unauthorized external system 33 (FIG. 1) would be prevented from seeking services from applications server 21 without such a token.

Figure 4:
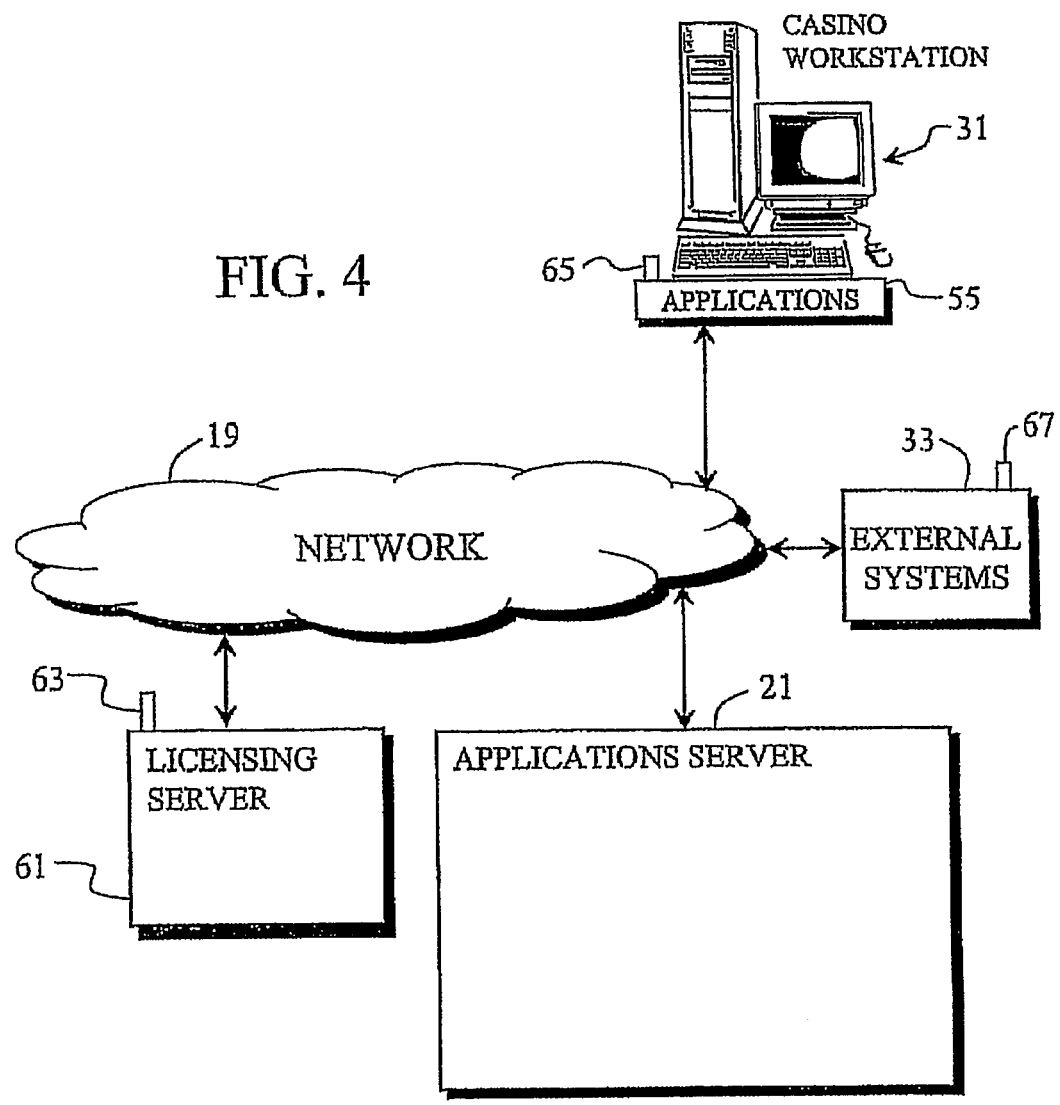
FIG. 4 is a block diagram of an embodiment of a portion of the casino management system of FIG. 1 in accordance with an embodiment of the present invention.

Referring to FIG. 4, a licensing server 61 may be connected to network 19 for supplying license tokens. Workstation 31 places a service request onto network 19, which is received by licensing server 61. Licensing server 61 responds back to workstation 31 providing a license token to workstation 31 for the particular service request. Workstation 31 attaches the license token to its request and places the request and token onto the network for receipt by applications server 21.

As an example, a casino may be licensed such that ten (10) jackpot fill client applications may receive services from applications server 21. When the eleventh jackpot fill client application begins requesting license tokens from server 61, that event is noticed by licensing server 61. One option for responding to this unlicensed situation is to provide the license token, but store this event in memory for subsequent retrieval by a service technician of the systems company. Upon retrieval, the technician will note that the casino needs to be licensed for the eleventh jackpot fill client application and then informs the casino management accordingly. Another option for server 61 responding to this unlicensed situation is not to provide the license token.

In an embodiment, licensing server 61 may be used to enable or disable features or behaviors according to jurisdictional regulatory requirements. As an example, application 55 on workstation 31 may request services related to harm minimization. Licensing server 61 may refuse a license token in jurisdictions that do not use harm minimization functionality. As another example, application 55 on workstation 31 may request services with jurisdiction-specific behavior, such as services related to ticket expiration. The license token provided by licensing server 61 may include jurisdiction-specific licensing information to enforce such behavioral requirements.

In addition, the owner of the casino system 11 may have a number of suppliers which are authorized (licensed) to gain access and obtain services from applications server 21. Those suppliers may be registered on license server 61 so that tokens will be dispensed to the listed supplier.

As will suggest itself, the functions of license server 61 may be carried out by an application 35 of applications server 21. In such an event, a separate server 61 is not utilized.

To provide security to system 11, encryption may be provided throughout the system, although encryption may be unnecessary for communication on link 25. In addition, licensing server 61 may include a hardware key 63, e.g., a USB "dongle plug". Hardware key 63 is removably pluggable into licensing server 61. When the hardware key 63 is removed from server 61, server 61 may not be modified or changed. Alternatively, the hardware key 63 may contain licensing information such that if the key 63 is removed, server 61 may no longer be capable of issuing licenses to applications that are subsequently launched. Similarly, a hardware key 65 may be provided in workstation 31 and a hardware key 67 may be provided at an external system 33.

Figure 5:
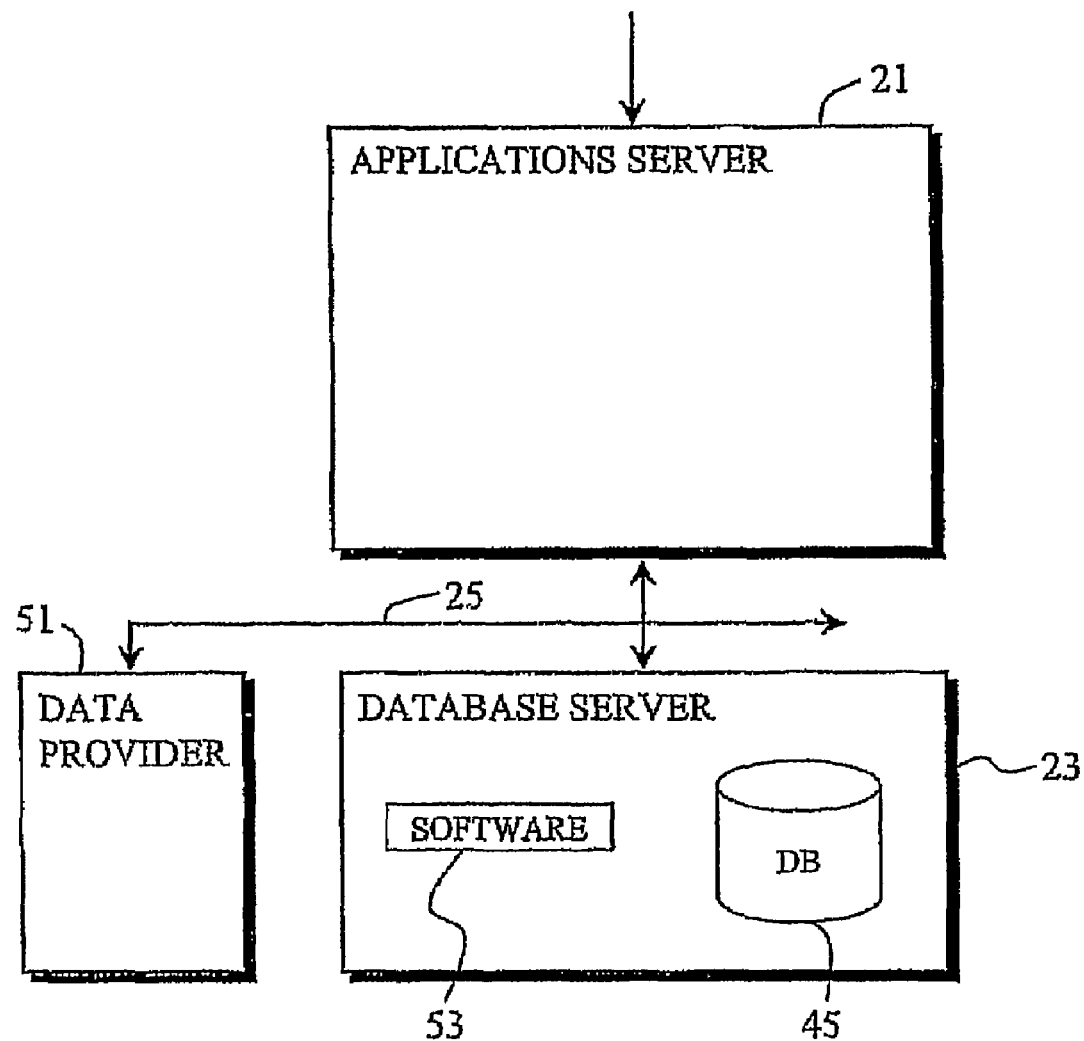
FIG. 5 is a block diagram of an embodiment of a portion of the casino management system of FIG. 1 in accordance with an embodiment of the present invention.

Referring to FIG. 5, applications server 21 accesses data primarily from database server 23. However, one or more other data providers 51 may be connected to communication link 25 in order to permit access by applications servers 21 (as well as server 49, shown in FIG. 3). A data provider 51 may be a second database server similar to server 23, or a remote casino network system, or a third party web service, or an external vendor system. For example, a casino employee at workstation 31 may request information as to the availability of a hotel room from a third party database server 51.

Where an additional database server 51 is added to system 11, for example to scale out the system, a load balancer, similar to balancer 20, may be disposed between applications server 21 and database servers 23, 51. In such a case, a cluster fault tolerant database solution may be used such that applications server 21 is blind as to the number of database servers it is accessing.

Figure 6:
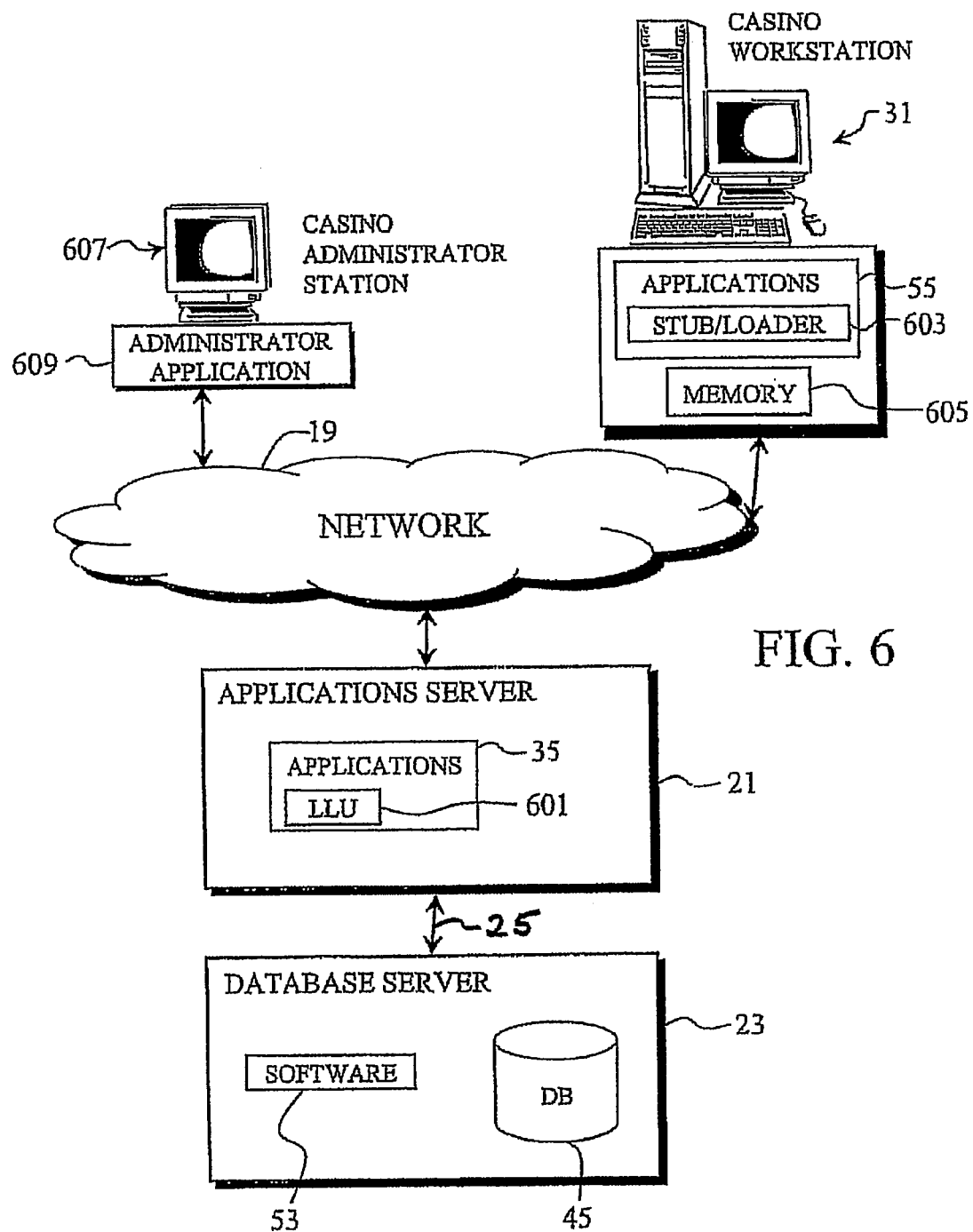
FIG. 6 is a block diagram of an embodiment of a portion of the casino management system of FIG. 1 in accordance with an embodiment of the present invention.

Referring to FIG. 6, casino workstation 31 includes a number of applications 55. From time to time, one of applications 55 may need to be updated by a new version of the software which forms the application 55. A Local-Live-Update software application ("LLU") 601 on applications server 21 updates the software applications 55. This takes place by LLU 601 downloading a fresh copy of the files associated with application 55 to workstation 31. The files may include the executable image of application 55 itself as well as any supporting files used by application 55 including but not limited to executable modules, configuration files, stored procedures, data files, help files, image files and the like. The fresh application files are retrieved from database 45. Alternatively, instead of placing the fresh application files in database 45, the files may be stored in separate memory, i.e., an application repository comprised of a hierarchy of file system folders, for example, separate from database server 23.

An application 55 may be updated, for example, in response to workstation 31 making a specific request to applications server 21 to provide an update. Alternatively, LLU 601 may automatically provide the software update without request from workstation 31. The automatic update may occur at a scheduled time, e.g., midnight on the last day of each month. Also, LLU 601 may update an application 55 each time the application 55 is to be run. LLU 601 may provide similar application update services to any system or workstation accessible via network 19 or communication link 25 including, for example, gaming machines 13, 15, 17, and external systems 33 of FIG. 1.

In an embodiment, LLU 601 may facilitate web-based application deployment from a web server to a gaming system, such as workstation 31 and/or gaming machine 13, 15, 17 (FIG. 1). Web-based gaming applications, services, and/or customized interfaces may be downloaded to and/or executed on the gaming system via LLU 601.

In an embodiment, application deployment does not interfere with a dependent application's normal operation and proceeds in a pseudo platform-independent fashion. Additionally, LLU 601 may validate file(s) against known good files when an application is launched to determine if a file should be replaced and/or updated.

In an embodiment, LLU 601 provides password protection or other authentication method to prevent unauthorized access to client applications. The LLU 601 may validate each application file against a known good file when the application is launched to prevent people from editing an application's file and running the application in an unknown state. To prevent a bypassing of the system, the LLU 601 may create a mutual exclusion object (MUTEX) which allows multiple application threads to share a common resource but not simultaneously. Thus, each client checks the MUTEX upon initialization to determine if an application may be accessed.

In addition, an application 55 or any of its supporting files may be downloaded from applications server 21 because the particular application 55 on workstation 31 has been altered or because some tampering has occurred with the software. For example, when a particular application 55 is to be run on workstation 31, the alteration is detected, and the fresh application files are then downloaded.

The detection of the altered files associated with application 55 occurs at the time that the application 55 is to be launched. A stub/loader application 603 is run on workstation 31 prior to each launching of an application 55. Stub/loader application 603 controls the launching of all client applications 55 on workstation 31. When stub/loader 603 is started, it queries the web service LLU 601 of applications server 21 for details of the particular application 55 which is to be launched. Stub/loader 603: (1) examines the local directory structure of the to-be-launched application 55, (2) determines the presence of each of the files of the to-be-launched application 55, (3) installs or updates each file as needed, and (4) launches the executable of the to-be-launched application 55.

For example, stub/loader 603 queries LLU 601 for the directories of each of the application's files. The LLU 601 returns to stub/loader 603 a data structure containing the directory names and hierarchy. The stub/loader 603 then compares the information in the returned data structure with the existing directories of the to-be-launched application 55.

Stub/loader 603 also queries LLU 601 for the file names of each of the to-be-launched application's dependent files. Stub/loader 603 compares the returned file names with the names of the files in the to-be-launched application 55.

Stub/loader 603 also queries LLU 601 for a hash value, such as an MD5 Hash value, for a specific file. LLU 601 does not hash the file; rather, the file is hashed at the time the file is added to the system. The hash value is stored in database 45 or other suitable location such as hardware key 63 associated with licensing server 61 (FIG. 4). Stub/loader 603 compares the returned hash value with the hash value obtained by the stub/loader hashing the file in the to-be-launched application 55. Using an MD5 hash routine, for example, stub/loader 603 inspects each file in the to-be-launched application 55.

Stub/loader 603 may also query LLU 601 for other details and information of the to-be-launched application, such as data related to the date and time the file was created, data related to when the file was last modified, etc. Stub/loader 603 may use this information to inspect the to-be-launched application 55 and its associated files. Other information that may be used includes, for example, the size in bytes of the specified file.

After inspecting the to-be-launched application with the information and data supplied by LLU 601, stub/loader 603 determines whether to install a new file, or replace an outdated file. In response to its determination that a new file is necessary or desired, stub/loader 603 queries LLU 601 for a data structure containing the entire file. Stub/loader 603 creates a file, writes the returned data structure into the file and dumps the file to the disk of workstation 31.

Once stub/loader 603 has updated the to-be-launched application, stub/loader 603 queries LLU 601 for the file name of the to-be-launched application's executable file. Upon return of the executable file's name, stub/loader 603 launches the executable file.

The stub/loader application 603 stores a unique identifier into memory 605 to indicate that the application 55 has been approved. When application 55 is finally launched, the application 55 looks for the unique identifier in memory 605. If it is found, the identifier is erased from memory 605, and the application 55 is launched. If the unique identifier is not found in memory 605, indicating that the application 55 has not been approved, the application 55 is not launched.

In addition to verifying that application 55 has not been altered, the stub/loader application 603 may also verify that there is a license to permit use of the application 55. Stub/loader 603 requests this service from licensing server 61 (FIG. 4).

As shown in FIG. 6, a casino administrator station 607 is connected to network 19. Station 607 is used by authorized personnel to install new applications and updates to the system, and to remove old applications.

For example, station 607 includes an administrator application 609 which queries LLU 601 to add new files to database 45 or to update existing files in database 45. Administrator application 609 transmits new file data to LLU 601 with a request to install or update a specified file in a specified application. In addition, administrator application 609 may (1) add a new application record to the database 45, (2) update the details of a specified application, (3) remove a specified file from database 45 and (4) remove a specified application and all of its files from database 45. Also, administrator application 609 may obtain information from database 45, as for example, (1) a data structure containing the file name of each of a specified application's files, (2) a data structure containing the details of a specified application, (3) a data structure containing the name of each application stored in database 45, (4) a data structure containing all of the information on a specified file, and (5) the number of files which belong to a specified application.

It is anticipated that regulatory requirements may dictate special access control for sensitive portions of casino network system 11 such as station 607. Examples of special access control may include but are not limited to locating station 607 in a physically secure and monitored room, requiring biometric identification, or requiring more than one authorized employee to be present in order to access system 607. It is further anticipated that casino network system 11 may be adapted as necessary to meet such regulatory requirements.

For purposes of simplicity, only three gaming machines 13, 15, 17 are shown in FIG. 1. In actuality, a casino may contain hundreds, or even thousands, of gaming machines. In addition to gaming machines, a casino may include various non-gaming machine locations, such as craps and blackjack. Such locations may include an SCI, similar to SCI 101 or 103, which is connected to network 19.

Each gaming machine will require its own particular services from application server 21. For example, some but not all gaming machines will be included in a progressive game and thus require a progressive service from applications server 21. Typically, all gaming machines will require an accounting service from server 21 which will account for coins and bills inserted into the gaming machine as well as an accounting of coins cashed out of the gaming machine to the player.

Other services, such as player tracking and cashless play services, can be provided by server 21. A typical player account may be stored in database 45 for tracking of the player. The player accounts are updated by server 21 as player information is sent to server 21 from gaming machines 13, 15, 17, workstation 31 or an external system 33. For example, a restaurant acting as an external system 33 may request server 21 to add loyalty points to the player's account in database 45 based on the amount of money spent by the player at the restaurant. As another example, a player at gaming machine 13 may request applications server 21 to convert 1000 points of the points balance in the player's account to credits on the credit meter of gaming machine 13. As another example, applications server 21 may provide game programs or other parameters to a particular gaming machine.

More specifically, gaming machine 13 sends a service request to applications server 21. SCI 101 (FIG. 2) packages the request in a proper protocol and places the request onto network 19. Various switches and/or routers may be included in network 19 in order to route the service request to applications server 21. The request may include (1) data, (2) a message request, and (3) the network address of applications server 21. The message request seeks a particular service to be performed by execution of an application 35. Application 35 is run in connection with the data, if any, in the request. Application 35, if required, then generates a message back onto network 19 addressed to machine 13. SCI 101 (FIG. 2) receives the message and responds accordingly, as for example, adjusting the credit meter, generating a display of information to the player, etc.

Alternatively, SCI 101 or 103 may be connected to a hub for wireless communication of the service request to the network 19. The service request is received by the hub, repackaged and then broadcast to a receiving device that is connected to the network. The receiving device packages the service request and places the service request onto the network.

Figure 7:
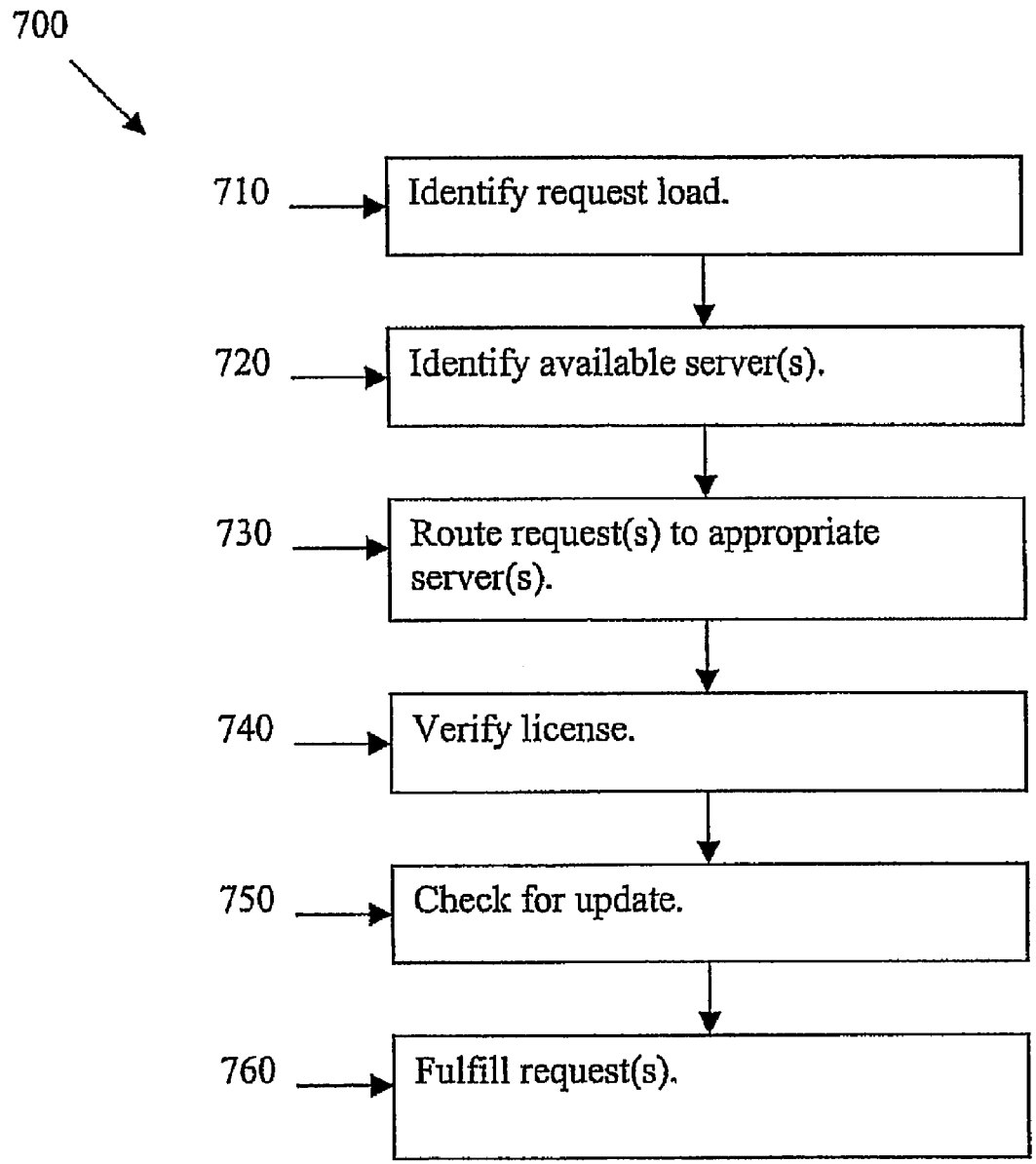
FIG. 7 is a flow diagram for a method for satisfying execution requests in accordance with an embodiment of the present invention.

Thus, as described above, certain embodiments facilitate execution of requests from gaming systems in a gaming environment. FIG. 7 is a flow diagram for a method 700 for satisfying execution requests in accordance with an embodiment of the present invention. First, at step 710, a request workload is identified. That is, a number of requests for applications and/or data from one or more gaming systems in a gaming environment, such as a casino, is determined. Then, at step 720, a number of available servers is identified. For example, server workload and applications and/or data available on each server may be determined.

Next, at step 730, pending request(s) are routed to one or more servers able to handle the request(s). For example, data requests are routed to appropriate data servers, and application requests are routed to appropriate application servers. Optionally, at step 740, a license or license token, for example, may be authenticated to verify that a requesting system is authorized to access a server, application, and/or data. In an embodiment, at step 750, a server responding to a request may optionally determine if an update to a requested application and/or data is appropriate. For example, as described above, a server may verify application integrity and/or check for an updated version of the application and install a corrected/updated version of the application before execution of the application for the requesting gaming system. Then, at step 760, requests are fulfilled by appropriate server(s).

Thus, certain embodiments of the present invention provide a load balancing system for a gaming environment. Certain embodiments provide a system and method for local live update of applications in a gaming environment. Certain embodiments facilitate web-based deployment of applications and services independent of gaming system platform. Applications may be validated for proper license and/or file integrity prior to execution and/or download.

Certain embodiments simplify application update cycles and ensure that all client systems in a gaming environment may be using the same version of an application. Certain embodiments provide for easy application roll-back in the event of a bad application release or other error. Certain embodiments minimize support and maintenance through load sharing, redundancy, and updatability. Certain embodiments prevent an application from running in an unknown or erroneous state.

Figure 8:
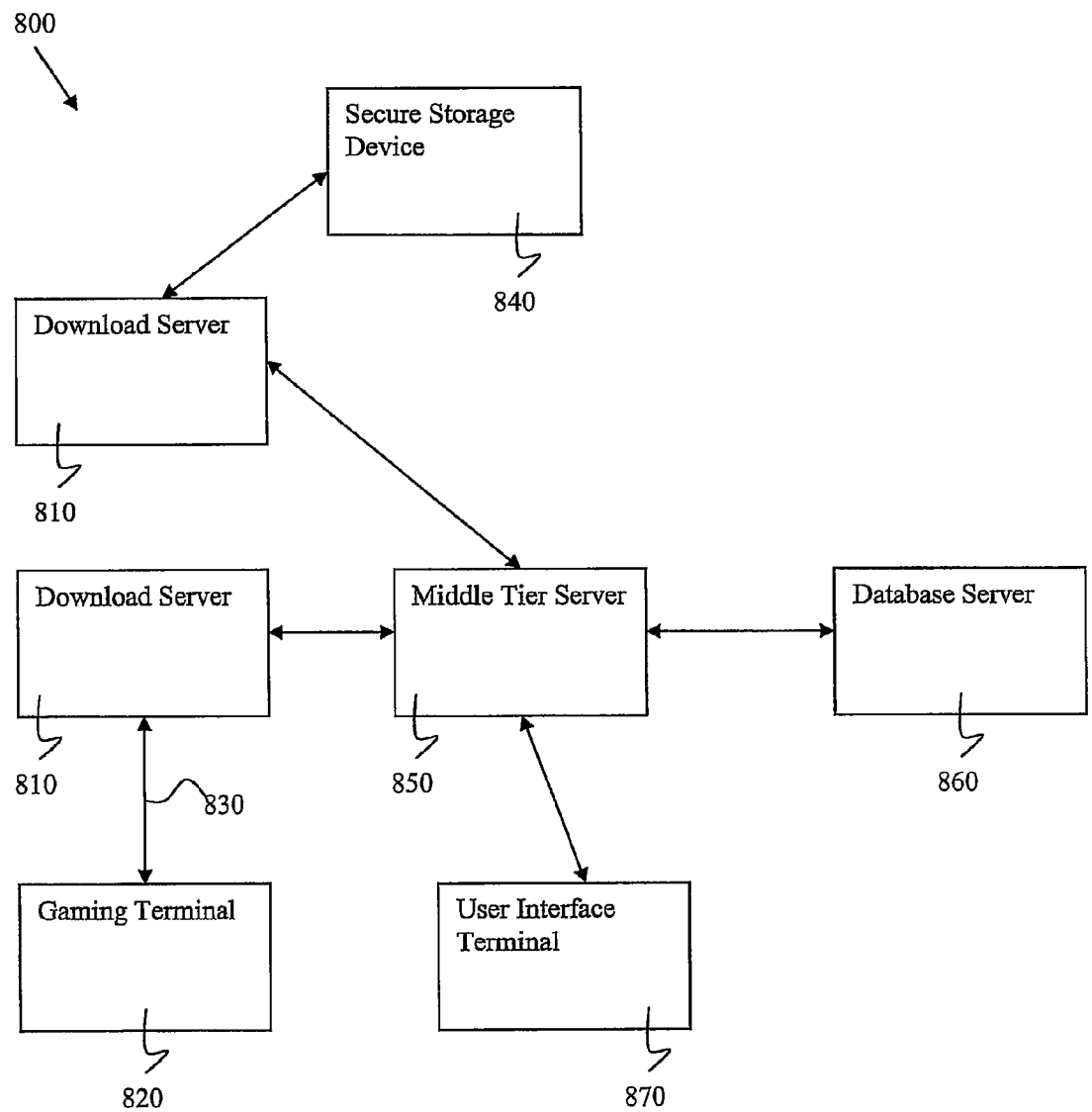
FIG. 8 illustrates a block diagram of a system that controls downloading of games and other data to gaming terminals in accordance with an embodiment of the present invention.

In certain embodiments, game(s) and/or other information may be downloaded from an external system to a gaming terminal and/or gaming environment for play at a gaming terminal. FIG. 8 illustrates a block diagram of a system 800 that controls downloading of games and other data to gaming terminals, such as electronic gaming machines, according to an embodiment of the present invention. The system 800 includes a download server 810, which is configured to provide a game and/or data to a gaming terminal 820. The download server 810 downloads data, such as game EPROM (Erasable Programmable Read-Only Memory) data, top box display data and/or public key or other encryption data to the gaming terminal 820. The download creates a verifiable digital signature to verify that the data sent was received in an uncorrupted form.

Data is transmitted between the download server 810 and the gaming terminal 820 via a communication line 830. In certain embodiments, the communication line 830 is a secure sockets layer (SSL) or transport layer security (TLS) communication line.

In certain embodiments, the download server 810 periodically sends a status request to the gaming terminal 820. The gaming terminal 820 verifies the data with a corresponding hash value.

If an error condition is determined, the gaming terminal 820 may be shut down or disabled for play. The gaming terminal 820 may be shut down or disabled until cleared by a technician, for example, and a new, clean copy of authentic game data is downloaded. Alternatively and/or in addition, the download server 810 and/or gaming terminal 820 may include and/or access an automated or semi-automated analysis and restoration program to provide the gaming terminal 820 with a clean copy of game data for execution, for example.

In certain embodiments, error conditions may be saved for analysis. For example, error conditions may be evaluated automatically and/or manually by a technician to look for a virus, identify a source of corrupted code, determine patterns suggesting hacking or intrusion, etc.

In certain embodiments, to verify data, a secure storage device 840, such as a read only disc or other memory, contains authentic software (and/or hash). The secure storage device 840 communicates with the download server 810 to verify authenticity of software and/or other data. The secure storage device may be integrated with and/or separate from the download server 810, for example.

In certain embodiments, a middle tier server 850 communicates with the download server 810 and a database server 860 to schedule events, transfer data and/or interface with a user interface terminal 870, for example. In certain embodiments the middle tier server 850 and/or download server 810 may include a plurality of servers 850 and/or 810, for example.

In an embodiment, a schedule of downloads to reconfigure all or part of a gaming floor may be scheduled via the user interface terminal 870, for example. Based upon criteria such as system parameters, an algorithm and/or other constraint, the download is sent to the gaming terminal(s) 820. For example, a download scheduling algorithm may include func (bandwidth)+func(gaming terminal download acceptance criteria)+func(time of download)+func(other criteria). That is, a download scheduling algorithm may be a function of bandwidth, download acceptance criteria for a gaming terminal, download time, and/or other criteria, for example. As but an example, downloads may be scheduled (or caused to be scheduled) in the early morning where bandwidth usage may be low).

In another embodiment, a download may be multi-cast to a plurality of gaming terminals, where any gaming terminal 820 that is designated to receive the download and is in a condition to accept the download is placed in a "listening" state. When the download is transmitted from the download server 810, gaming terminal(s) 820 in a listening state will accept the download. Alternatively and/or in addition, a download may be broadcast to a plurality of gaming terminals regardless of state.

In another embodiment, a peer-to-peer network is established. For example, a gaming terminal 820 in need of a particular download will receive all or a portion of the download from other gaming terminals having the file and/or from the download server 810. That is, based on one or more criteria, such as a connectivity, availability, bandwidth, etc., a gaming terminal 820 may receive a download from other peer gaming terminals instead of or in addition to the download server 810.

In another embodiment, the gaming terminal 820 may store in a memory, such as a flash memory or disk, some or all games for play on the gaming terminal 820. The gaming floor may be reconfigured by transmitting a signal to the gaming terminal 820 to load a designated game from memory. By replacing the memory and/or adding/deleting content in the memory, the gaming floor may be varied. Alternatively and/or in addition, a plurality of games installed on the gaming terminal 820 may be offered for selection by a player. In certain embodiments, random number(s) and/or other results facilitating game play may be transmitted and/or otherwise stored in the memory for operator of the gaming terminal 820.

In certain embodiments, download scalability is provided. For example, the download server 810 communicates with the gaming terminal 820 and the middle tier server 850. The middle tier server 850 acts as a hub and can communicate with a plurality of download servers 810. The middle tier server 850 communicates with the database server 860. By providing a middle tier, the system 800 may be scaled using one or more download servers 810. In certain embodiments, a plurality of middle tier servers 850 may be used to communicate with a plurality of download servers 810 and a plurality of gaming terminals 810 (and one or more database servers 860), for example.

Each gaming terminal 820 communicates with a download server 810. The download server 810 communicates via a package including security such as a digital signature and SSL or TLS. In certain embodiments, a status request for a hash function related to data contents may be sent to the gaming terminal 820. The gaming terminal 820 responds (e.g., through SSL/TLS and with a digital signature) with a hash that is compared to verify authenticity.

One or more download servers 810 communicate with a middle tier server 850. The middle tier server 850 communicates with the database server 860 and the user interface server 870. In certain embodiments, persistent data, such as meter data, security data, user settings, regulatory game playback and/or other game audit data may be stored at the database server 860, for example.

Certain embodiments provide a centrally located access point where a regulator and/or gaming operator may view gaming system configuration information, game and/or other data download information and the like. Via the access point, an authorized user may also confirm authenticity and accuracy of downloaded and/or downloadable files. Additionally, historical data, such as meter data, game playback, accounting information and scheduling information, may be reviewed.

In certain embodiments, one or more gaming terminals 820 are in communication with one or more download servers 810. The download server(s) 810 are in communication with one or more middle tier servers 850. The middle tier server(s) 850 are in communication with one or more database servers 860. One or more user interface servers 870 communicate with the one or more middle tier servers 850. Through the user interface 870, a regulator and/or operator may view and verify system information, such as a current state of downloads, game(s) on individual gaming terminal(s) 820, and/or authenticity of those game(s). The user interface 870 may be configured to communicate with a workstation at a regulatory and/or operations office to allow remote viewing of system data and operation, for example.

FIG. 9 illustrates a flow diagram for a method 900 for multi-tiered game download in accordance with an embodiment of the present invention. At step 910, a request is received for a game download to at least one gaming device. For example, a download server and/or a middle tier server may receive a download request from a gaming device, such as an electronic gaming machine (EGM) (e.g., a slot machine, fruit machine, video Poker machine, Keno or Bingo machine, or any other electronic gaming device or terminal). Gaming devices may also include a live table game such as Blackjack, Pai Gow, or Baccarat, a multi-terminal gaming machine such as multi-terminal roulette, Sik Bo, Poker, dice game, and others that may be connected with a multi-tiered download server system via a network. As another example, the download request may be received from a user interface terminal, a casino operator workstation, etc.

At step 920, the request for game download is scheduled from at least one of a plurality of download servers via a middle tier server. For example, based upon criteria such as system parameters, an algorithm and/or other constraint, the requested download is sent to the requesting gaming device(s). For example, a download scheduling algorithm may include a function of bandwidth+a function of gaming terminal download acceptance criteria+a function of time of download+a function other criteria. That is, a download scheduling algorithm may be a function of bandwidth, download acceptance criteria for a gaming terminal, download time, and/or other criteria, for example.

At step 930, one or more download resources are allocated via the middle tier server to satisfy the request for game download. For example, one or more download servers and/or resources at the one or more download servers may be allocated by the middle tier server to accommodate the download request to one or more gaming devices.

At step 940, the requested game is downloaded to the gaming device(s). In certain embodiments, game data may be provided in a peer-to-peer download or sharing arrangement by another gaming device. In certain embodiments, a game download may be multi-cast to a certain subset of gaming devices and/or broadcast to all connected gaming devices, for example.

In certain embodiments, the game download is verified by the gaming device(s) and/or the middle tier server to help ensure accurate download. If an error is identified, the affected gaming device(s) may be locked and/or otherwise flagged until the file is re-downloaded and/or otherwise corrected at the gaming device(s).

In certain embodiments, a gaming device may be reconfigured based on game data stored in memory at the gaming device in response to a signal from the middle tier server and/or a download server to initiate the reconfiguration. For example, a game may downloaded and/or otherwise stored at a gaming device and later activated to reconfigure the gaming device.

In certain embodiments, monitoring and oversight of gaming device operation, download and/or middle tier server operation, and/or game download may be reviewed for audit and/or regulatory purposes, for example, via an access point provided by the middle tier server and/or a user interface server or terminal in communication with the middle tier server.

One or more of the steps of the method 900 may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

Thus, certain embodiments control download rate in relation to available bandwidth. Certain embodiments allow multi-casting downloads. Certain embodiments allow peer-to-peer downloads.

The download systems and methods described above may be used in conjunction with a variety of gaming systems/environments. The gaming system can take a number of different forms. In a first form, a stand alone gaming machine is provided wherein all or most components required for implementing the game are present in a player operable gaming machine. In a second form, a distributed architecture is provided wherein some of the components required for implementing the game are present in a player operable gaming machine and some of the components required for implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisioned. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

In a thick client embodiment, a game server implements part of the game played by a player using a gaming machine and the gaming machine implements part of the game. With this embodiment, as both the game server and the gaming machine implement part of the game, they collectively provide a game controller. A database management server may manage storage of sentinel and chip information, game programs and/or associated data for downloading or access by the gaming devices in a database. Typically, if the gaming system enables players to participate in a Jackpot game, a Jackpot server will be provided to monitor and carry out the Jackpot game.

In a thin client embodiment, the game server implements most or all of the game played by a player using a gaming machine and the gaming machine essentially provides only the player interface. With this embodiment, the game server provides the game controller. The gaming machine will receive player instructions, and pass the instructions to the game server which will process them and return game play outcomes to the gaming machine for display. In a thin client embodiment, the gaming machines could be computer terminals, e.g. PCs running software that provides a player interface operable using standard computer input and output components.

Servers may also be provided to assist in the administration of the gaming system, including for example a gaming floor management server and a licensing server to monitor the use of licenses relating to particular games. An administrator terminal is provided to allow an administrator to monitor the network and the devices connected to the network.

The gaming system may communicate with other gaming systems, other local networks such as a corporate network, and/or a wide area network such as the Internet, for example through a firewall.

Persons skilled in the art will appreciate that in accordance with known techniques, functionality at the server side of the network may be distributed over a plurality of different computers. For example, elements may be run as a single "engine" on one server or a separate server may be provided. For example, the game server could run a random number generator engine. Alternatively, a separate random number generator server could be provided.

The components, elements, and/or functionality of the system(s) described above may be implemented alone or in combination in various forms in hardware, firmware, and/or as a set of instructions in software, for example. Certain embodiments may be provided as a set of instructions residing on a computer-readable medium, such as a memory or hard disk, for execution on a general purpose computer or other processing device.

Several embodiments are described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any machine-readable media for accomplishing its operations. As noted above, the embodiments of the present invention may be implemented using an existing computer processor, or by a special purpose computer processor incorporated for this or another purpose or by a hardwired system.

As noted above, certain embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Certain embodiments of the invention are described in the general context of method steps which may be implemented in one embodiment by a program product including machine-executable instructions, such as program code, for example in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Certain embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, handheld devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of certain embodiments of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

Those skilled in the art will appreciate that the embodiments disclosed herein may be applied to the formation of a variety of gaming systems. Certain features of the embodiments of the claimed subject matter have been illustrated as described herein; however, many modifications, substitutions, changes and equivalents will now occur to those skilled in the art. Additionally, while several functional blocks and relations between them have been described in detail, it is contemplated by those of skill in the art that several of the operations may be performed without the use of the others, or additional functions or relationships between functions may be established and still be in accordance with the claimed subject matter. It is, therefore, to be understood that the appended claims are intended to cover all such modifications and changes as fall within the true spirit of the embodiments of the claimed subject matter.

While certain embodiments of the present invention have been described, it should be understood that these embodiments are subject to many modifications and changes without departing from the spirit and scope of the appended claims. For example, it will be understood that the invention disclosed and defined in this specification extends to all alternative combinations of two or more of the individual features mentioned or evident from the text or drawings. All of these different combinations constitute various alternative aspects of the invention. It will also be understood that the term "comprises" (or its grammatical variants) as used in this specification is equivalent to the term "includes" and should not be taken as excluding the presence of other elements or features.

The invention claimed is:

1. A system for game download, said system comprising:
   a gaming terminal for local play of a game, said gaming terminal including a communication interface receiving and transmitting data to download a game for play at said gaming terminal;
   at least one download server communicating with said gaming terminal to provide game data for download to said gaming terminal for local play of a game at said gaming terminal; and
   a middle tier server acting as a hub to communicate with said at least one download server to provide said game data to said gaming terminal from said one or more download servers, said middle tier server scheduling a download of game data from said at least one download server to said gaming terminal.

2. The system of claim 1, further comprising a database server and a user interface server, and wherein said middle tier server provides data from at least one of said database server and said user interface server.

3. The system of claim 1, wherein download of data from said at least one download server to said gaming terminal is scheduled as a function of at least one of: (1) available bandwidth, (2) gaming terminal download acceptance criteria and (3) time of download.

4. The system of claim 3, wherein said gaming terminal download acceptance criteria comprises availability of said gaming terminal for download based on user activity at said gaming terminal.

5. The system of claim 3, wherein said download of data is scheduled as a sum of functions of available bandwidth, gaming terminal download acceptance criteria, and time of download.

6. The system of claim 1, wherein download of data from said at least one download server is multi-cast to a plurality of gaming terminals set in an appropriate receiving mode.

7. The system of claim 1, and further including at least an additional gaming terminal, and wherein download of data from said at least one download server is broadcast to all of the gaming terminals.

8. The system of claim 1, and further including at least an additional gaming terminal, and wherein download of data to said gaming terminal is facilitated from said additional gaming terminal such as the data is downloaded to said gaming terminal from said additional gaming terminal rather than from at least said one download server, said download of data facilitated by said middle tier server.

9. The system of claim 1, wherein said gaming terminal is reconfigured based on game data stored in memory at said gaming terminal in response to a signal from said at least one download server.

10. The system of claim 1, further comprising an access point for review of gaming terminal operation and data.

11. The system of claim 10, wherein said access point comprises a user interface.

12. The system of claim 10, wherein said access point facilitates verification of said gaming terminal operation and data.

13. The system of claim 12, wherein said access point provides auditing and regulatory oversight of said gaming terminal operation, data, and downloads.

14. The system of claim 12, wherein said gaming terminal verifies the download of data in conjunction with the middle tier server.

15. The system of claim 14, wherein, if an error is detected in the download of data, a clean copy of the download data is downloaded to said gaming terminal.

16. A method for multi-tiered game download for use in a gaming system having at least one gaming device, a plurality of download servers and a middle tier server, said method comprising:
   receiving a request for a game download of a game to at least one gaming device;
   scheduling via a middle tier server the request for game download from at least one of a plurality of download servers;
   allocating, via said middle tier server, one or more download resources from said plurality of download servers to satisfy the request for game download; and
   downloading the game to said at least one gaming device.

17. The method of claim 16, further comprising verifying said game download to said gaming device.

18. The method of claim 16, wherein the request for game download to said gaming device is scheduled as a function of at least one of available bandwidth, gaming terminal download acceptance criteria and time of download.

19. The method of claim 16, wherein said gaming system has a plurality of gaming devices configurable in a receiving mode, and further including multi-casting the game download to a plurality of gaming devices configured in a receiving mode.

20. The method of claim 16, wherein said gaming system has a second gaming device, and further comprising downloading said game to said gaming device from a second gaming device rather than from one of said plurality of download servers; and facilitating said game download by said middle tier server.

21. The method of claim 16, wherein said gaming device has memory, and further comprising reconfiguring said gaming device based on game data stored in memory at said gaming device in response to a signal from at least one of: (1) said middle tier server and (2) one of said plurality of download servers.

22. The method of claim 16, wherein said gaming system has an access point for review of gaming device operation, data and downloads, and further comprising facilitating auditing and regulatory oversight of said gaming device operation, data, and downloads via an access point.

23. The method of claim 16, further comprising detecting an error in the game download; and retrying game download of said game to said gaming device.

24. A system for multi-tiered gaming data download, said system comprising:
   a gaming device for local play of a game, said gaming device including a communication interface receiving and transmitting data to download a game for play at said gaming device;
   a plurality of download servers communicating with said gaming device to provide game data for download to said gaming device for local play at said gaming device; and
   a middle tier server acting as a hub to communicate with said plurality of download servers to provide game data from one or more of said plurality of download servers, said middle tier server allocating download server resources and scheduling a download of game data from at least one of said plurality download servers to said gaming device based on resource constraints at said plurality of download servers and availability for download at said gaming device.

25. The system of claim 24, wherein download of game data from at least one of said plurality of download servers to said gaming device is scheduled as a function of available bandwidth, gaming terminal download acceptance criteria and time of download.

26. The system of claim 24, and further including a second gaming terminal; and wherein download of game data to said gaming device is transferred to said gaming device from a said second gaming terminal rather than from one of said plurality of download servers based upon scheduling and coordinate by said middle tier server.

27. The system of claim 24, further comprising an access point for auditing and regulatory oversight of said gaming device operation, data, and downloads.

* * * * *

UNITED STATES PATENT AND TRADEMARK OFFICE
CERTIFICATE OF CORRECTION

PATENT NO.        : 8,337,301 B2                                  Page 1 of 1
APPLICATION NO.   : 11/938105
DATED             : December 25, 2012
INVENTOR(S)       : Jerry S. Topham It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1276 days.

Signed and Sealed this
Twenty-eighth Day of October, 2014

Michelle K. Lee
*Deputy Director of the United States Patent and Trademark Office*